United States Patent [19]

Schanze

[11] 4,357,358

[45] Nov. 2, 1982

[54] FEEDSTUFF OR FEEDSTUFF ADDITIVE AND PROCESS FOR ITS PRODUCTION

[76] Inventor: Rudolf Schanze, Flutgrabenweg 1a, D-8430 Neumarkt, Fed. Rep. of Germany

[21] Appl. No.: 175,382

[22] Filed: Aug. 5, 1980

Related U.S. Application Data

[63] Continuation-in-part of Ser. No. 37,775, May 7, 1979, abandoned, which is a continuation of Ser. No. 835,593, Sep. 22, 1977, abandoned.

[30] Foreign Application Priority Data

Sep. 24, 1976 [DE] Fed. Rep. of Germany ....... 2643093
Aug. 18, 1977 [DE] Fed. Rep. of Germany ....... 2737295

[51] Int. Cl.$^3$ ............................................... A23L 1/28
[52] U.S. Cl. ....................................... 426/62; 426/72; 426/623; 426/636; 426/807
[58] Field of Search ................. 426/623, 69, 624, 630, 426/635, 636, 807, 583, 454, 518, 519, 72

[56] References Cited

U.S. PATENT DOCUMENTS 2,223,904  12/1940  Zentz et al. .......................... 426/636
2,430,797  10/1947  Zenzes ................................. 426/636

OTHER PUBLICATIONS

Morrison "Feeds and Feeding", Morrison Pub. Co., 1957, 598–599, pp. 23, 24, 59–60, 83–84, 221–222, 379–381, 397–398, 515–516, 543–544, 550–553.

*Primary Examiner*—Hiram Bernstein

[57] ABSTRACT

Animal feedstuffs in pressed form compressed at a pressure less than 700 atmospheres to a bulk density of about 0.3 to about 1.3 g/ml and having a water content from about 8% to about 14% by weight are provided which are based on at least one comminuted, solid, structured, fibrous, agricultural by-product having a preponderance of its fibers of a minimum length of about 1 cm the agricultural by-product having a length of about 10 to about 160 mm, together with at least one digestible, non-structured industrial, non-textured by-product and/or residue with nutrient value. The structured agricultural product in the feedstuff in the pressure form still retains its structured integrity thereby to provide chewability and bite to the feedstuff. The feedstuff preferably is in the form of pellets having a size defined as follows: the diameter of the pellets is between about 14 mm and about 32 mm, the length of the pellets is between about 15 and about 50 mm; and the density of the pellets is between about 0.9 and about 1.3.

19 Claims, No Drawings

FEEDSTUFF OR FEEDSTUFF ADDITIVE AND PROCESS FOR ITS PRODUCTION

RELATED APPLICATION

This application is a continuation-in-part of application Ser. No. 37,775 filed May 7, 1979 now abandoned which itself was a continuation of application Ser. No. 835,593 filed Sept. 22, 1977 (now abandoned).

BACKGROUND OF THE INVENTION

1. Field of the Invention

The invention relates to animal feedstuffs in pressed form based on solid, fibrous, agricultural by-products and non-fibrous additives, and to a process for the production thereof.

2. Description of the Prior Art

The feeding of cereal straw and leguminous straw to ruminants and pigs as ballast or inert material is known. However, since straw has a large volume and its nutritional value is low, it is used only in emergencies for feeding purposes. In recent years agriculture has become greatly restructured. Because, in many cases, cattle raising has been discontinued and cereal and leguminous crops have taken its place, straw occurs in large amounts. The ground conditions are frequently such as to make it almost impossible to plough in all the straw, and the burning of excess straw is becoming increasingly less possible on account of environmental protection reasons.

Up till now, straw has not been able to be used in a practical manner as a cattle feedstuff. Morrison, in the textbook "Feeds and Feeding, A Handbook for the Student and Stockman", 22nd edition, Ithaca, N.Y., The Morrison Publishing Company, 1957, suggests that coarse forage is useful as a part of a feed for a ruminating animal since, if kernals of whole grain escape mastication when first eaten, they are brought up for rumination only if entagled in coarse forage. However, straw which consists of the mature stumps and leaves, without the seeds has relatively little protein, starch or fat while the content of fiber and lignin is high, is known to be very much lower in nutritional value than is hay made from the same plants, and also is known to be less palatable than good hay while both hay and straw are useful as coarse forage. Because of the low nutritive value, straw can be useful as part of the ration for animals not being fed for high production. It is much less useful for dairy cows, for fattening cattle or lambs or for calves. Straw is especially unsuited to form a large part of the ration for sheep. In order to make straw more palatable, pulped roots and meal are sometimes mixed with the cut or chaffed straw and the moist mass allowed to soften. To induce animals to eat more straw than they would otherwise eat, it may be sprinkled with diluted molasses. One allegedly effective feed mixture is oat straw, corn silage and a protein-rich concentrate. Other feed regimens suggested include straw plus cottonseed cake or meal, or straw and alfalfa or other legume hay. The fodder value of straw is limited by the content of lignins, which make it largely impossible to utilize the straw. Methods have been developed for breaking up and decomposing the straw by treatment with strong alkalis. This decomposition process was so technically perfected that the fodder value and digestibility of straw could be raised from a previous value of approximately 35 to 50% to 60 to 70%. The thus broken-down straw has the disadvantage, however, that it is eaten only reluctantly, by cattle. Feed concentrates must therefore be mixed with it in order to make it acceptable to cattle. Straw furthermore has the disadvantage that despite its high content of hydrocarbons, it contains no other nutrients worth mentioning and only some hardly utilizable protein and a few minerals.

Straw has the advantage that it satisfies cattle and especially ruminants as a "structure" or fibrous element, as long as its structure remains to a sufficient degree. Furthermore, on account of its carbohydrates, acetic acid formation in the rumen and thus the milk fat production is increased during digestion in ruminants, and preferably in dairy cattle. On account of its particular properties, namely its structure or fibrousness-satisfying ability, and promotion of acetic acid formation, straw has a basic value as a cattle feedstuff.

In harvesting feedstuff cereals, especially maize, those parts of the plants that were hitherto discarded with the straw or other waste, such as the fructification parts of the cereal grains or the fallen leaves, are harvested together with the hard seeds in order to retain the structure and the roughage components, and to raise and fully utilize the nutrient value of the plants.

This is particularly so in the case of fodder maize recovery. In maize harvesting, the leaf parts covering the maize seeds, the so-called husks, and the fructification parts, the so-called columellae, are harvested and processed together with the seeds. A part of the previously occurring agricultural by-products is thus added as a bonus to the seed mass. The product thereby obtained is termed a maize-husk-spadix conglomerate, or a maize-husk-spadix grist or a maize-columellae mixture, or a maize-collumellae grist, or even as corn-cob-mix (maize seed with columellae and/or involucral leaf or husk). For the sake of simplicity, only the expression "maize-husk-spadix grist" will be used hereinafter. This expression is intended to cover all the aforementioned expressions and also all types of conglomerates and mixtures of parts of the maize plant.

The same applies if other types of cereals, e.g., oats, wheat or rye are harvested in a similar manner as described above, so that on harvesting a conglomerate or mixture is obtained which contains, in addition to the seeds, other plant parts such as, e.g., fructification parts or leaves, which were hitherto discarded as straw or other waste residue. Such mixtures of seeds and other plant parts which have been obtained exclusively for animal feeding purposes are termed "feedstuff or fodder cereal mixtures" in the present application. However, these feedstuff mixtures have the disadvantage that their protein content is very low.

Flax is one of the oldest fibre and food plants, and even today it is still widely cultivated. Chaff and capsules occur in the recovery of fibres from the flax plant and are in many cases discarded.

A large proportion of the citrus fruits produced in the world is not supplied directly to the consumer but is processed in preserving and fruit-juice factories into canned fruit, juice or juice extracts and similar foodstuffs. Bananas are also processed directly by many foodstuff manufacturers. For example, infant foods and dried fruits are often prepared from bananas.

Many other types of fruits are also processed in factories to form compotes, fruit salads, dry fruits, juices and similar products.

Large amounts of skin, peel, etc. occur in the large-scale processing of citrus fruits, bananas and other types of fruit. The skin, peel, etc. of citrus fruits, bananas and other structured fruit remains were hitherto not processed further since they rapidly become rotten and great difficulty was experienced in disposing of them.

Further structured intermediate products which were discarded and not further utilized in the past are the malt sprouts that occur in many areas, especially in malt beer production.

It is also known that numerous digestible, industrial, non-structured by-products, after-products and residues having a nutritional value occur, such as for example, whey, protein-enriched residues from milk processing, spent molasses residues or vinasse, other spent material or slops, pulp or trash, α-cellulose, starch, brewer's yeast, brewer's grains, brewery residues, distillery residues, fermentation residues, dregs, kieselguhr residues, and other residues. All these products are in principle suitable as feedstuffs, but have hitherto hardly been utilized to any significant extent on account of their one-sided nature and their particular properties.

In the decomposition of milk into high value human foodstuff products, by-products occur such as for example rennet whey in cheese making. Rennet whey is processed in large amounts into unfermented whey powder. However, many after-products that are difficult to dispose of also occur in addition to rennet whey. In the production of curds, high lactic acid wheys are formed, and wheys from which the sugar and protein have been removed are formed in milk sugar production and lactose recovery. In addition there are the residues from modern, biologically milk processes, such as from ultrafiltration, reverse osmosis and electrodialysis. Such after-products are difficult to use.

German Patent Specification No. 1,492,787 describes a process for the production of feedstuffs, in which sour whey and/or buttermilk is used as the milk processing product. In this known method protein-containing, carbohydrate-enriched and/or fat-rich additives are added in gel form to the acid whey and/or buttermilk. In the feedstuff thereby obtained the proportion of protein-containing, carbohydrate-rich additives is no longer in a structured form and accordingly the degree of satisfaction of this feedstuff is insufficient. High lactic acid or hydrochloric acid wheys can be processed and utilized only by using special methods and procedures (see German Patent Specification No. 1,492,787).

Numerous residues also occur in sugar production, wood production, brewing processes and distilling processes, and also in fermentation processes, which are difficult to remove but which basically have some nutritional value and accordingly could be used as feedstuffs.

It is also known that glutamic acid or citric acid can be recovered from molasses, i.e. residues from the sugar industry, spent molasses wash or vinasse remaining, this residue is in principle also suitable as a feedstuff.

Save-all substance or "trash" occurs in the processing of wood. This is pure α-cellulose, suitable as a feedstuff which could be fed to ruminants with the same success as starch. However, in practice it is not possible to feed save-all substance or trash to ruminants since the moist, crumbly product is neither palatable nor easily processible. It is therefore burnt or transported at great expense to refuse dumps.

Brewer's yeast, brewer's grains, dregs and kieselguhr residues occur in large breweries. In many cases these are high value feedstuffs but cannot be used in the normal way for feeding purposes on account of their high residual moisture content.

The afore-described, solid, structured, agricultural by-products and the likewise afore-described digestible, industrial, non-structured by-products, after-products or residues or residues having a nutritional value are:

(1) in principle suitable as feedstuffs, but are one-sided substances and thus need to be substantially augmented and structured in an animal-oriented manner;

(2) can be used in small amounts as feedstuffs in the traditional manner, but no longer in the present-day regional and local accumulations, and are accordingly an environmental problem;

(3) can no longer be finally improved or refined or converted into usable end products in plants situated at their point of production; and (4) can be converted into end products at the point of their production only by using an enlarged and specialized plant. The additional expenditure thereby incurred is, however, no longer covered by the possible market proceeds from the end product, and losses therefore arise.

There are many patents which suggest modified animal feeds. Thus, U.S. Pat. No. 3,840,670 patented Oct. 8, 1974 to Fermented Products Inc. suggested culturing whey with *Lactobacillus bulgarium* and *Lactobacillus acidophilis*; combining it with corn germ meal; and aerating and curing the fermented product to provide a non-hygroscopic free-flowing, self-preserving animal feed supplement.

U.S. Pat. No. 554,913 patented Sept. 22, 1925 by W. P. M. Grelch provides a self-preserving wet food product of mallet grain including the sprouts in fresh undried state and impregnated with a preservative quantity of lactic acid.

U.S. Pat. No. 2,430,797 patented by A. M. Zenzes provides a dry-to-the-touch non-fibrous food involving comminution of dry fibrillous food material to great fineness.

U.S. Pat. No. 4,015,018 patented Mar. 29, 1977 to Food Technology Products provides an ensilaged animal feed from a forage crop which has been chopped into small pieces, along with sodium diacetate and dehydrated whey.

U.S. Pat. No. 2,363,730 patented by Nicholas L. Simmons provides a food material containing a protein and hydrolyzed whey.

U.S. Pat. No. 2,223,904 patented Dec. 3, 1940 by M. Zentz et al provides a compressed fodder from vegetable raw materials compressed at a high pressure of about 700 to 1500 atmospheres.

U.S. Pat. No. 2,173,922 patented Sept. 26, 1939 by The Borden Company provides dried whey including therein an organic water-insoluble non-gelatinized substance.

U.S. Pat. No. 1,555,246 patented Sept. 29, 1925 by W. P. M. Grelch provides a self-preserving food product from milk, steeping grain hulls and lactic acid.

British Pat. No. 406,403 of Emil Heller provides an animal feed including chopped straw, crude crystallized sugar, molasses and ordinary dry fodder.

British Pat. No. 1,361,266 patented by Eltsac Feeds Limited provides an animal feed from calcium hyroxide, a feeding stuff meal, and molasses.

British Pat. No. 1,317,003 patented by Secko Malsuoki provides an animal feed from cellulosic feedstuffs by treating them with the enzyme lignione.

British Pat. No. 1,139,136 patented by L. B. Heesen et al provides a composite forage in pellet form grounds and/or seeds which are so crushed that the starch components are pulverized but the cellulosic compound is broken into pieces.

British Pat. No. 877,691 patented by James & Co. (Hungerford) Limited provides a feedstuff made of suger, a meal made from immature herbage, a high protein content material and dried distillery concentrate.

British Pat. No. 532,247 patented by Naamlooze Vennootschap provides a foodstuff of comminuted different vegetable products.

Canadian Pat. No. 788,936 patented July 2, 1968 by Cargill Inc. provides a pelleted mineral feed involving the use, as a binder, of spent sulfite liquors.

Australian Pat. No. 4828-26 is directed to a process for making fodder consisting in mixing ground maize stalks (rachis) with wet brewery residue. According to this patent "flour" produces from the stalks is used. The maize stalks can also be grounded to groats or flakes. This flour of maize stalks is then impregnated with beer wort contained in spent malt. The fodder obtained is a paste and does not have any bite. It is known that flour or flakes or groats easily absorb moisture and liquid.

Australian Pat. No. 4829-26 is directed to a process for making useful products from sugar cane. The ripe sugar cane contains about 29 to 34% by weight solids and 60 to 71% by weight water. In the normal working up about 10 to 11% sugar is removed so that approximately one third of the solid is used and about two thirds of the solid is wasted. To use this material, it is ground so that it can be used directly as fodder. The ground product may be subjected to a sifting process since only the small particles are rich in sugar. This patent, therefore, aims to use the sugar as contained in the sugar cane. After the grinding it is necessary to carry out a heat treatment so that one obtains more tasty compounds. One obtains three sections. The finest meal constitutes a valuable good fermentation agent and baking powder for bakeries and it can be used for different purposes. The second section may be used as fodder, either alone or mixed with normal fodder substances. In order to make the product more stable it is possible to add maize cobs deprived of grains to it.

Australian Pat. No. 7813/27 is directed to a fodder which can be used for cattle and/or sheep in time of draught. The fodder comprises a relative large portion of a selected roughage, among others corn stalks or straw, and a relatively small portion of materials high in digestible proteins. The fodder comprises:

| desicated sorghum | 100 parts (or 71%) |
| molasses | 5 parts (2.9%) |
| lucerne meal | 25 parts (17.9%) |
| corn meal | 5 parts (3.6%) |
| cotton seed meal | 2.5 parts (1.8%) |
| meat meal | 2.5 parts (1.8%) |

The product thus comprises 6.2% digestible protein and 34.6% digestible carbohydrate.

Australian Pat. No. 8800/27 relates to an artificial food for farm stock. This fodder comprises a meal of prickly pear spines and substantially creamless milk, e.g. skim milk or separated buttermilk. Skim milk or buttermilk as used in this fodder are valuable products with nutrive value which are fodder as such. The prickly pear spines are cut and dried in the air. They afterwards are ground. The ground material is mixed with the skim milk or buttermilk and one obtains a paste. This pasty composition does not have any bite.

Australian Pat. No. 21,770/29 is directed to the manufacture of artifical foods for farm stock. Fish meal and prickly pears are mixed to obtain a dry food product.

Since the prior art as noted above is deficient, the main object of the present invention is thus to provide animal feedstuffs and a process for their production, in which the aforementioned products, which occur in large amounts, which are easily procured, and which can in principle be used as feedstuffs, are employed. In this connection, the substances are intended to have an optimum utilization by the cattle, so that the costs involved in the production of animal food products, e.g., milk and meat, can be lowered, and also the costs for removing and eliminating such residues can also be decreased.

The feedstuff according to the invention is intended to have a high satisfaction value and at the same time to be readily accepted by cattle.

SUMMARY OF THE INVENTION

(i) Aims of the Invention

An object of this invention then is the provision of an animal feedstuff in pressed form based on solid, structured agricultural by-products and additives.

Another object of this invention is the provision of a process for producing such animal feedstuffs.

(ii) Statement of Invention

This invention thus provides an animal feedstuff in pressed form compressed at a pressure less than 700 atmospheres to a bulk density of about 0.3 to about 1.3 g/ml based on solid, fibrous, agricultural by-products comprising: (a) from about 25% to about 95% by weight dry matter of at least one comminuted, solid, structured fibrous agricultural by-product, having a low nutritional value and, to provide structure selected from the group consisting of cereal straw, leguminous straw, maize columellae, maize-husk-spadix grist, feedstuff cereal mixture, flax plant chaff, flax plant capsules, fibrous fruit peel, fibrous fruit skin and malt sprouts such agricultural by-product having a length of about 10 to about 160 mm; and (b) from about 75% to about 5% by weight dry matter of at least one digestible, non-structured industrial by-product or residue with nutrient value, selected from the group consisting of whey, (preferably unpasteurized) protein-enriched residues from milk treatment processes, molasses residues, vinasse, α-celluloses, starch, brewer's yeast, brewer's grains, brewing residues, distillery residues, fermentation residues, dregs, kieselguhr residues, chitin; the feedstuff in such pressed form having a moisture content of about 8 to about 14% by weight; the structured agricultural by-product in the feedstuff in the pressed form still retaining its structured integrity thereby to provide chewability and bite to the feedstuff.

This invention also provides a process for the production of an animal feedstuff from solid, fibrous, agricultural by-products, the process comprising the steps of: (a) intensively mixing (i) from about 25% to about 95% by weight dry matter of at least one comminuted, solid, structured fibrous agricultural by-product having a low nutritional value and a length in the range between about 10 and about 160 mm to provide structure, selected from the group consisting of cereal straw, leguminous straw, maize columellae, maize-husk-spadix grist, feedstuff and cereal mixture, flax plant chaff, flax plant capsules, fibrous fruit peel, fibrous fruit skin and malt sprouts, with (ii) from about 75% to 50% by weight dry matter of at least one water-containing, digestible, non-structured industrial by-product or residue with nutrient value, selected from the group consisting of whey, (preferably unpastureized), protein-enriched residues from milk treatment processes, molasses residues, vinasse, molasses residues, α-cellulose, starch, brewer's yeast, brewer's grains, brewing residues, distillery residues, fermentation residues, dregs, kieselguhr residues, and chitin; (b) partially drying the mixture thereby obtained to a moisture content of about 8% to about 14% by weight; and (c) processing the mixture into a compressed product by compression at a maximum pressure of 700 atmospheres, to provide a pressed pellet of bulk density of 0.3 to 1.38 g/ml and a moisture content of about 8 to about 14% by weight in which the structured integrity of the agricultural by-product is maintained; thereby to provide chewability and bite to the feedstuff, so that the feedstuff is adequate for ruminating process.

(iii) Other Features of the Invention

By one feature of this invention, the pressed feedstuff is in the form of pellets, the diameter of the pellets being between about 14 mm and about 32 mm; the length of the pellets being between about 15 mm and about 50 mm; and the density of said pellets being between about 0.8 and about 1.3.

By another feature of this invention, the pressed feedstuff is in the form of pellets, diameter of said pellets being between about 18 mm and about 24 mm; the length of the pellets is between about 25 mm to about 45 mm; and the density of the pellets is between about 0.7 and 0.85.

Another feature of this invention is the provision of such feedstuff wherein component (a) comprises cereal straw; and wherein component (b) comprises whey.

By another feature, the animal feedstuff is one wherein component (a) comprises from about 25% to about 85% by weight dry matter of at least one material selected from the group consisting of cereal straw and leguminous straw; and wherein component (b) comprises from about 75% to about 20% by weight dry matter of by-product whey.

By another feature, the components (a) and (b) are so selected that the animal feedstuff comprises:

from the group consisting of fats and fatty acids and mixtures thereof.

By another feature of the process of this invention, the processing step comprises compressing the partially dried mixture under moderate pressure, thereby to provide an animal feedstuff in pelleted form, the diameter of said pellets being between about 14 mm and about 32 mm; the length of the pellets being between about 15 mm and about 50 mm; and the density of the pellets being between about 0.8 and about 1.3.

By a further feature, the diameter of the pellets is between about 18 mm and about 24 mm; the length of the pellets is between about 25 mm to about 45 mm; and the density of the pellets is between about 0.7 and 0.85.

By still another feature, the processing step is carried out by the combination of a metering screw and a press where the partially dried material is formed into compressed fodder at moderate pressure substantially less than 1000 atmospheres.

By another feature of the process of this invention, the process is carried out wherein step (a) comprises: intensively mixing (i) about 25% to about 80% by weight dry matter of at least one material selected from the group consisting of cereal straw having a length of about 120 to 160 mm and leguminous straw with about 75% to about 20% by weight of by-product whey; wherein step (b) comprises: partially drying the mixture thereby obtained; and wherein step (c) comprises: compressing the mixture into an animal feedstuff while essentially retaining the length characteristic and structured integrity of said fibrous cereal straw or legumous straw.

By another feature, the partial drying step is carried out in a green fodder drying plant.

By a further feature, the partial drying step is carried out in a slurry drying plant.

By yet another feature, the process includes the step of adding sufficient water prior to or during step (a) to ensure intensive mixing of the fibrous by-product and the other by-product.

By still another feature, the process includes the further step prior to or during step (a) of the addition of chitin.

It has surprisingly been found that, in order to provide an animal feedstuff that has the necessary "bite", it is necessary to use a structured fibrous ingredient hav-

| straw | 35 to 50% | by weight dry matter |
|---|---|---|
| low lactose, protein-enriched whey | 15 to 36% | by weight dry matter |
| a digestible, industrial by-product or residue with nutrient value selected from the group consisting of α-cellulose and chitin and mixtures thereof | 2 to 10% | by weight dry matter |
| vinasses | 2 to 10% | by weight dry matter |
| non-dried brewer's grains | 20 to 35% | by weight dry matter |
| mineral substances and conventional additives selected from the group consisting of antibiotics, enzymes, hormones, trace elements, vitamins, pharmaceuticals, and preservatives and mixtures thereof | up to 2% | by weight dry matter |

By a still further feature of this invention, the fibrous fruit peel is selected from the group consisting of citrus fruit peel and banana peel, and mixtures thereof.

By yet another feature, the animal feedstuff further includes about about 5% to about 20% by weight dry matter of concentrated brewer's yeast and about 1% to about 4% by weight dry matter of a compound selected ing a fibrous length of about 1 to about 16 cm formulated and processed in such a way that its structured integrity is maintained. Thus, while in the past feedstuffs were known which included, e.g., straw or maize husks, such structured fibrous materials were ground so that they lost their structured integrity. Such ground material is thus a non-structured material and absorbs a liquid. Such a material, when fed to cattle, would form a sludge or suspension and so the feedstuff would have no bite. On the other hand, it has surprisingly been found that a feedstuff having a comminuted structured fibrous material of a length of at least 1 cm must be chewed by cattle, i.e., cattle are forced to bite it. Thus, it has been found that for proper feeding of cattle, the feed should contain a structured fibrous material whose structured integrity is maintained since such material is needed for their rumen. All such materials in the prior art have been ground. A granular material having a particle size of up to 0.9 cm is not regarded in this art as structured.

It has also been surprisingly found that the animal feedstuff containing about 25% up to preferably about 40% by weight of such structured ingredient can be compacted without great pressure, i.e. a pressure substantially less than about 1000 atmosphere. It had been known in the past that straw, having a bulk density of 0.1 g/ml could only be compacted under very great pressure. The animal feed of this invention compacted under moderate pressure preferably has bulk density of 0.3–0.7 or 0.5 to 0.6 g/ml.

In the present invention, the pellets generally have a diameter of between about 14 and about 32 mm, preferably between about 18 and about 24 mm. Their length is generally between about 15 and about 50 mm, preferably between about 25 and about 45 mm. The density of the pellets depends on the proportion of the amount of structured fibrous material to the unstructured nutrient material. Generally it is between about 0.8 and 1.3, with the greater proportion of structured fibrous material resulting in a higher density. With pellets of diameter of about 30 mm with a thickness of about 20 mm (between about 15 mm and about 30 mm depending on the amount of structured fibrous material), the density is about 0.7 to about 0.85.

It has also surprisingly been found that the proportion of moisture in the partially dried mixture, of about 8% to about 14% by weight, is critical. Should feed containing less than about 8% water be compressed, it quickly becomes too dry and too dark, in addition to being too compact through compression. In other words, it acquires an undesirable woodlike structure. Compressed pellets containing more than about 14% water tend to disintegrate due to the high humidity and possess insufficient storage consistency. Pellets having between about 14% and about 18% water content are too soft, and begin to disintegrate during transportation and handling. Should the feed have more than 18% water, it cannot be compressed under moderate pressure to form pellets and wet crumbs are the result.

The above is especially true of pellets containing structured straw. For compressed power feed, i.e., nutritive concentrates, the permissible values for water content are different; for instance, alfalfa pellets having about 18% water still hold together.

The structured integrity of the structured fibrous ingredient is thus of intrinsic essential importance in the animal feed of this invention.

If one is to consider power feed for milk producing animals and bulls, there are two problems:

(a) the feed volume to be ingested by the animal must be so large such that additional necessary power feed is contained in that volume, i.e., the feed must be in accordance with the quantitative and qualitative requirements for its nutritional value; and (b) since in ruminating animals the feed first lands in the rumen to be broken down by microorganisms, the feed must be balanced in energy, egg white, mineral particles, etc., such that later on the feed value leaving the rumen is sufficient to cover the needs of the animal. In other words, the feed must be adequate for ruminating animals.

In order to satisfy this requirement, the animal feed must possess structure to require the animal to chew the feed.

As Morrison (see above) also states, this structure in the feed is achieved within the ratios by means of roughage, which, however, is nutrtionally poor, as with hay and silage. Thus, where performance is a factor, the nutritional value of a power feed, i.e. a feed concentrate, must be provided.

Structured feed, and particularly straw-containing feed, is converted in the rumen towards acetate, which yields milk fat. Power feed having large amounts of easily digestible carbohydrates and egg whites is converted towards propionates which yields milk sugars (milk or meat). This latter process however, occurs only when there is sufficient structure in the feed, which leads to rumination, (i.e., mixing with saliva, and pH-raising via saliva-sodium bicarbonate). Otherwise, the pH value in the rumen sinks, and disturbances of the metabolism results.

For milk performance, it is necessary that the raw fiber content be somewhere between about 20 and about 22% of the dry weight. Under no circumstances should it fall under about 18%. The ratio of acetic acid to propionic acid of about 3 to about 1 in the rumen, which is necessary for good milk and fat performance, is thereby achieved. The limit of about 18% precludes the idea of feeding cattle exclusively or primarily highly digestible power feed. Especially for high milk performance, it is necessary to maintain the limit of about 18%. The feeds taught by Morrison do not satisfy this requirement.

The physical structure of the roughage feed should be bulky, glumaceous and coarse in fiber. This stimulates the cow to ruminate intensively, thereby aiding the production of saliva. The latter again is necessary to neutralize the over-produced acid in the rumen of the cow due to the use of too much power feed. To date, there are no unequivocal values for the required structure. It is well known, however, that without structured feed, a cow cannot be kept healthy and performing highly.

The essential characteristic of the present invention is that the straw is treated in such a manner as to keep its structure intact. Since straw alone is difficult to process, and is much too voluminous, it is, according to the present invention, complemented with a non-structured material. The nutritional value is thereby heightened, as well as the technological ability to be handles for compression. The resulting feed possesses the up-till-now separate characteristics of a structured feed (roughage) and a power feed (nutritive concentrate) simultaneously. This is the key characteristic of the present invention apart from the fact that the desirable goal that waste by-products are recycled is achieved.

The animal feedstuff according to the invention is suitable for all types of animals. As noted above, it is preferably fed to ruminants, but can also be used to feed horses, pigs, animals in zoos and game, especially in wintertime.

The animal feedstuff according to this invention can be fed directly as such or can be added as a feedstuff additive to normal feedstuffs. If the animal feedstuff according to the invention is used as a feedstuff additive, it can be mixed with low protein or high protein feed concentrates or with basic feedstuffs, e.g., hay, dry scraps, molasses, potatoes, etc. If the feedstuff additive according to the invention is used together with other feedstuffs, its amount can be varied depending on the specially used feedstuff and the given fodder requirements. When used as a feedstuff additive, it can be admixed in any arbitrary amounts. When used to complement basic feedstuffs, the feedstuff according to the invention is generally mixed with the basic feedstuff in amounts of about 20 to about 60%, preferably about 20 to about 50% by weight referred to the total dry mass. If the animal feedstuff according to the invention is used together with feedstuff concentrates, its amounts may vary widely and lie in the range of about 10 to about 90% by weight, preferably about 20 to about 70 and most preferably about 20 to about 50% by weight referred to the feedstuff concentrate.

The animal feedstuff according to the invention thus contains as the solid, structured, fibrous agricultural by-product, the comminuted, special length fibers of cereal straw, leguminous straw, maize columellae and the like, maize-husk-spadix grist, fodder cereal mix, chaff and capsules from the flax plant, citrus fruist peel, banana peel, other structured fruit residues, malt sprouts or mixtures thereof, and as the digestible, industrial, non-structured by-products, after-products or residues with nutrient value, whey, protein-enriched residues from milk processing, molasses residue slops or vinasse, other slops, save-all substances or trash, α-cellulose, starches, brewer's yeast, brewer's grains, brewing residues, distillery residues, fermentation residues, dregs, kieselguhr residues, chitins, or mixtures thereof. The composition of the feedstuff is thus governed by the local conditions. The feedstuffs generally contain about 25—about 95% by weight of structured by-product and about 75 to about 5% by weight of non-structured product.

In the animal feedstuffs which contain cereal straw, leguminous straw, maize columellae or mixtures thereof as structured product, the solid, structured, agricultural by-product is present in amounts of about 25 to about 80% by weight, preferably about 30 to about 80% by weight, and most preferably about 30 to about 65% by weight. The digestible, industrial, non-structured by-product, after-product or residue with nutrient value is present in amounts of about 75 to about 20% by weight, preferably about 70 to about 20% by weight and most preferably in amounts of about 70 to about 35% by weight. All the above amounts refer to the dry compositions. If less than about 25% by weight of solid, structured, agricultural by-product, for example, cereal straw or leguminous straw is used, the fodder can only be produced in a complicated manner, and if more than about 80% by weight of cereal straw, leguminous straw or maize columellae are used, the nutrient value of the fodder is not sufficient.

The feedstuffs according to the invention, which may contain as the solid, structured, fibrous special fiber length by-product, maize-husk-spadix grist and/or a fodder cereal mixture and/or chaff and capsules of the flax plant and/or citrus fruit peel and/or banana peel and/or other structured fruit residues and/or malt sprouts, alone or mixed with the aforementioned structured, fibrous by-products, contain about 25 to about 80% by weight of solid, structured, agricultural by-product and about 75 to about 20% by weight of digestible, industrial, non-structured by-product, after-product or residue with nutrient value, but preferably contain about 55 to about 95% by weight, referred to the dry mass, of maize-husk-spadix grist or fodder cereal mixture, alone or mixed with the other mentioned structured by-products and about 45 to about 5% by weight of the non-structured by-products and/or residues. All percentages by weight refer to dry proportions.

The solid, structured, agricultural by-product, e.g., straw, is present in comminuted and fibrous form in the animal feedstuff according to the invention, and generally has a length of between about 10 and about 160 mm, preferably about 90 to about 20 mm and below. In the pellets of the invention the structured integrity of the straw must be maintained.

GENERALIZED DESCRIPTION OF EMBODIMENTS

In the following tables, the lengths of the comminuted fibers and weight ratios are given using the example of straw, and are obtained by using various comminution devices.

| Lengths of comminuted fibers and weight ratios for straw | | | | | | |
|---|---|---|---|---|---|---|
| | Greatest Lengths | | Average Lengths | | Smallest Lengths | |
| Comminution System | mm | % | mm | % | mm | % |
| Chopper for green material | 400 | 15 | 250 | 40 | 150 | 35 |
| Chopper for green material, rebuilt | 130 | 30 | 70 | 40 | 30 | 30 |
| Plane disc mill (according to the pre-chopper, which was rebuilt for green material) | 90 | 5–10 | 50 | 20–30 | 20 | 75–6 |
| Special apparatus "Tubgrinder" (hammer mill) | 50 | 10 | 20–30 | 70 | 20 | 20 |

The animal feedstuffs according to the invention may, for example, contain fibrous citrus fruit peel, for example, from grapefruit, mandarins, lemons, limes, oranges, or bitter oranges.

The animal feedstuffs according to the invention may, as previously mentioned, also contain chitins. As used herein in the present application, chitin is intended to refer to a digestible, industrial, non-structured by-product, after-product or residue. The shells, i.e., the outer skeletal structure of, for example, crabs and insects, and also the cell walls of algae, yeasts, fungi and lichen consist of chitin. Chitin also occurs in krill. Chitin from all sources can be used in the feedstuffs according to the invention. However, chitin produced in the processing of krill is preferably used.

A preferred feedstuff contains straw, whey and krill residues.

The animal feedstuffs according to the invention may furthermore contain up to about 5% by weight referred to the dry composition of solid, structured, agricultural by-product and digestible, industrial, non-structured by-product, after-product or residue with nutrient value, conventional additives, e.g., antibiotics, enzymes, hormones, trace elements, minerals, vitamins, pharmaceuticals, preservatives or mixtures thereof. Additives which may be used are, for example, all those described in Ullmann's Encyclopaedia, Volume 7, pages 731 ff. They may also contain preservatives. e.g., propionic acid and derivatives thereof.

A preferred basic feedstuff system according to the invention contains, expressed as dry matter in the end product:

| | |
|---|---|
| Highly comminuted straw | about 25 to about 75% |
| Low lactose content and protein-enriched (ammonium compound) unpasteurized whey or another milk residue | about 75 to about 25% |

Other water-containing residues can be used with this basic feedstuff system. A further preferred feedstuff system according to the invention contains, also expressed as dry matter in the end product:

| | |
|---|---|
| Highly comminuted straw | about 35 to about 50% |
| Low lactose content and protein-enriched (ammonium compound) whey | about 15 to about 36% |
| Save-all and trash substances, preferably α-celluloses and/or chitin | about 2 to about 10% |
| Vinasses (also with adhesive effect) | about 2 to about 8% |
| Brewer's yeast, preferably concentrated brewer's yeasts | about 5 to about 20% |
| Undried brewer's grains | about 20 to about 35% |

The following may be added as further additives to this feedstuff system, likewise expressed as dry matter in the end product:

| | |
|---|---|
| Fats and fatty acids | about 1 to about 4% |
| Mineral substances | about 2 to about 5% |
| Vitamins and/or other active substances | up to about 2% |

In the implementation of the process according to the invention, the necessary amounts of cereal straw, leguminous straw, maize columellae or their mixtures are comminuted to the given lengths in suitable apparatus as described above. The non-structured by-products, after-products or residues with nutrient value, which are present in liquid, moist or crumbly form, may be added to the solid, structured, agricultural by-product before or after the comminution. However, these materials can be added to the comminution apparatuses, intermittent mixing thereby taking place simultaneously in the comminution apparatus. Thus, whey or other low lactose content, protein-enriched milk residues can be added to the comminution apparatus. If the non-structured by-products, after-products or residues are present in liquid form, they can also be sprayed into the solid, structured, agricultural by-product or dispersed therein after the comminution. The mixing of the two feedstuff constituents is critical and must be carried out intensively, since the strong adhesiveness or stickiness of the non-structured liquid residues that sometimes occurs must be reduced to such an extent, either by mechanical incorporation into the structure phase, or by a sufficient residence time in transportation for penetration into the structure phase to take place, that formation of deposits in the drier is avoided or is kept within tolerable limits in the subsequent drying process.

This is achieved in accordance with the invention if, when using green drying plants and with less intensive mixing, the comminution and mixing is displaced forwardly in the direction of the transporting means so that an infiltration is made possible by the thereby achieved longer transportation times in the conveying devices and by appropriately regulating the amounts.

Alternatively, this is also achieved by special apparatuses, for example, plane disc mills, which are able simultaneously to cut into fibers coarse, pre-cut structures residues, and intimately mix them with liquid residues, with the result that a time-saving effect comparable to the penetration action is obtained in this way.

The time for the penetration should be at least about 10 minutes. This time corresponds to the conveying path in conventional green drying plants which are regulated to operate with the highest throughput. The passage of the mixture through the conveying path is, however, preferably about 15 to about 25 minutes, which can be taken as a prerequisite with normal throughputs.

If smaller amounts of structured, agricultural residues (straw, etc.) and larger amounts of non-structured components are used, the penetration period or the mixing intensity can be raised. This is also the case if the adhesiveness of the liquid additives, for example with vinasses or wheys that are still too rich in lactose, is decidedly high.

In the case of very high unavoidable adhesiveness of the liquid additives (high sugar content in the molasses or wheys), it is preferred to use structured and non-structured products by means of which the adhesiveness will be reduced, e.g., maize columellae and α-cellulose-containing, fine fibred products or chiin-containing products and brewer's grains and brewer's yeasts.

The milk residues, especially wheys, can also be strongly decomposed into lactic acid via fermentation, whereby their protein content can simultaneously be substantially increased by ammoniation. In this way the adhesiveness is also indirectly reduced and the processibility is facilitated.

The mixture is then partially dried to the required moisture content of about 8 to about 14% by weight in a conventional drying plant for grass, green maize or other green material, and processed in a manner known per se into compressed fodder or compressed fodder additives, which can be sent directly to the consumer.

Grass and/or green drying plants are widely distributed in natural pastureland regions or areas with natural pastureland and arable land regions, since in the past few decades the artificial drying of green fodder has achieved considerable importance. The normal plants are arranged so that the usual green material, e.g. meadow and pasture growth, green cereals, green maize, etc. can be taken in, and the soft material may optionally be comminuted and dried in an efficient manner. The initial water content of the green material of about 60 to about 80% is reduced to a residual water content of about 12 to about 14%, and this dried green product is then processed into compressed fodder.

It is a substantial advantage of the process according to the invention that the mixture of comminuted, solid structured, agricultural by-product and digestible, industrial, non-structured by-product, after product or residue with nutrient value can be further processed, i.e., dried and compressed in such special plants for drying green fodder.

The water content of the mixture is reduced in the process according to the invention in the green drying plant to a residual content of approximately 8 to about 14% by weight, preferably about 10 to about 12% by weight. The residual moisture is governed by the local factors and the water content of the starting mixture.

The water content of the mixture before it has been dried is considerably reduced compared with the green material usually processed in green drying plants (which on average contains between about 60 and about 80% water), and is on the average between at least about 20 and at most about 60%, and preferably between about 25 and about 40%. The burner settings and the air intake are adjusted to these values, which can easily be accomplished in the units by changing to nozzles with a smaller heating medium throughput and reducing the ventilator performance.

The residual moisture of the end product obtained in the green drying plants, for example in the case of green cobs, is on average in the range from about 10 to about 18% by weight, preferably between about 12 and about 15% by weight. The residual moisture of the end product obtained by the process according to the invention and having the compositions according to the invention is found in practice to be somewhat lower, on average between about 8% and about 15% by weight, preferably between about 8% and about 12% by weight.

After the material has been dried, it is separated from the air in a separator, for example in a cyclone. The dried material generally has a temperature of about 75 to about 90° C. at the outlet, and is conveyed via transporting and metering screw devices to a press where the dried material is formed into compressed fodder, in general into compact bodies of solid shape, and uniform cross-section and varying length. The smaller of these bodies are termed "pellets", bodies having an average diameter of about 10 to about 30 mm are called "cobs" and larger bodies are termed "briquettes". The compacted animal feedstuff according to the invention can be stored for a long time without decomposing.

A substantial disadvantage of the known green drying plants is that in the past they could only be used in the "green" season, i.e., from May to October. This utilization period of only half a year is a disadvantage since the fixed costs over the whole year have to be borne by half a year's production.

Green drying plants could not be used hitherto for processing straw and liquid, non-structured raw materials. It has surprisingly now been found that by suitably choosing the structured by-products and the non-structured by-products, after-products or residues, and by suitably choosing the weight proportions, mixtures are obtained which can undergo green drying and can provide a high quality, competitively priced compressed fodder.

In the present invention, low value residues from the milk industry are preferably used in the liquid phase. Particularly suitable are high lactic acid wheys, other highly acidic wheys and lactose molasses having a high acid content. If such materials are not present, acidification can be achieved by introducing lactic acid cultures, e.g., as are used in cheese making. In this way a high acid content and a correspondingly low lactose residue content are obtained. These wheys and residues are then neutralized with ammonia, whereby ammonium lactate or other ammonium compounds are obtained which serve as a NPN source and as protein enrichment for the end product.

A product produced from comminuted straw and protein-enriched, concentrated whey with reduced lactose content is particularly suitable for ruminants.

A preferred feedstuff according to the invention consists of about 25 to about 80% of cereal straw or leguminous straw and about 75 to about 20% of whey, referred to the dry matter. In the production of such a feedstuff, two problems may arise, namely that (a) sufficient amounts of straw cannot be procured, or (b) sufficient amounts of low value wheys cannot be obtained. Molasses residue slops, brewer's yeast, brewer's grains and other brewing residues, and slops and spent washes of all types can be used as a substitute for the missing whey.

In a further embodiment, strongly curd acid, post-acidified curd whey is used as starting material. These wheys can be artificially post-acidified by adding lactic acid-forming compounds, or sweet wheys and rennet wheys can be converted into lactic acid wheys by adding lactic acid-forming agents.

The fermentation by lactic acid-forming agents up to a maximum of about 18% dry substance in the whey substrates can be carried out in the existing tank capacities. This can be carried out by a prior concentration of the whey overall, but can also be carried out by blending with higher concentrations and untreated wheys. Curd acid, rennet sweet wheys can also be mixed with concentrated lactose molasses and permeat material from filtration and osmosis treatments.

In this connection, the fermentation range is maintained in the optimum pH and temperature ranges by continuously adding ammonia or ammonia water after a pH value of below about 5 has been reached, in order to achieve a constant neutralization and heating effect from the exothermic reaction and thereby accelerate the fermentation and the NPN synthesis.

A fermentation of up to about 50% of the given lactose can easily be achieved, with the result that with normal contents of about 70 to about 75% by weight of lactose in the dry substance in addition to the native proteins of the wheys of about 11.5% dry substance, easily feasible total protein values of $(11.5 + 35 = 46.5$, or $11.5 + 37.5 = 49)$ about 45 to about 50% dry substance can be obtained from the lactic acid residues.

By means of all these measures, it is possible to process the amount of whey, depending on the operating situation and desired fodder system, within a day into the feedstuffs according to the invention.

Further advantages of the present invention are the following:

(1) Environmental problems caused by the occurrence of large amounts of straw, degraded wheys and milk residues and also by residual spent washes from molasses, vinasses, and after-products from brewing and wood treatment are solved.

(2) Capacity and load problems of processing plants for milk residues and seasonal operations involved in green drying are solved.

(3) The fodder problems in high yield cattle herds with regard to ration balancing in acetate-forming and propionate-forming agents based on combining raw structure fibres from straw and energy and protein enrichment from the liquid phase by whey, etc., are solved.

(4) The economy of the previous utilization of these waste products is improved for all the parties concerned.

SPECIFIC DESCRIPTION OF PREFERRED EMBODIMENTS

The following examples illustrate the invention.

EXAMPLE 1

40,000 l of curd acid whey having a density of 1.023 (=40,920 kg), a dry substance content of 5.5% (=2250 kg) and a SH-value of 70° are neutralized with 25% ammonia water (density 0.91, dry content 35% NH$_3$).

The SH-value denotes the Soxhlet-Henkel value, and an SH-value of 42.5° corresponds to 1% lactic acid in the liquid.

An SH-value of 70° denotes a lactic acid amount of approximately 29.5% in the whey dry matter; this corresponds to 659 kg of lactic acid. In the neutralization 17 parts by weight of ammonia are used for 90 parts by weight of lactic acid. This corresponds to 659 kg of lactic acid and 125 kg NH$_3$=784 kg of ammonium lactate. The protein value of this nonprotein nitrogen source (NPN source) is 0.81=635 kg of protein.

In the neutralization of 40,000 l of curd acid whey, 40,920 kg of material are obtained with a content of 2250 kg of dry matter. The dry matter contains 11.5% protein; this corresponds to 259 kg.

The dry matter in the whey is thus increased (by NH$_3$) to 2375 kg; there is now (259+635 kg protein)=894 kg=37.6% protein/dry substance.

After neutralization the whey is evaporated in the dairy to a dry solids content of 33% in the concentrate. The concentrate has a density of 1.15 and a pH value of 6.5.

Straw is comminuted to an individual particle size of 20 to 50 mm in a green drying plant and when the straw leaves the comminution unit the whey concentrate from the dairy is added thereto in the feed device. The whey concentrate is mixed with straw in a weight ratio of 40:60. The mixture thus obtained is passed to a conveying device in the green drying plant and is dried on the drum at heating gas temperatures in the range from approximately 170° to 220° C. to a residual moisture content of approximately 12%.

After the product has been dried it is separated and passed via conventional conveying devices to the press. Cobs having an average diameter of 15 to 30 mm are produced in the press. These cobs can be sent directly to the consumer.

The following calculations on a dry substance basis (abbreviated to TS) are used for the mixing of the whey concentrate and the straw in the ratio 40:60:

| | | |
|---|---|---|
| 2375 kg whey-TS | = | 40% |
| + 3565 kg straw-TS | = | 60% |
| 5940 kg mixture-TS | = | 100% |

Since straw contains about 89% TS, approximately 4000 kg of straw are required.

The end product obtained has a dry substance content of approximately 90 to 91%, and accordingly 110 kg of cobs are formed from 100 kg of dry substance fed to the plant.

| | Nutrient substance calculation | | | | |
|---|---|---|---|---|---|
| | Values in the dry substance | | | | |
| Product/Raw material | Protein % | Crude fibre % | Ash % | Fat % | Starch unit |
| Curd acid neutralized whey | 37.8 | — | 8.5 | 1.0 | 685 |
| Straw, barley summer | 4.0 | 43.4 | 6.0 | 1.8 | 310+ |
| Product mixture (TS) | | | | | |
| 40% whey-TS | 15.1 | — | 3.4 | 0.4 | 275 |
| 60% straw-TS | 2.4 | 26.1 | 3.6 | 1.1 | 186 |
| 100% = | 17.5 | 26.1 | 7.0 | 1.5 | 461 |
| End product (with 91% TS) = cobs approx. | 16.0 | 23–24 | 7.3 | 1.3 | 420 |
| Comparison | | | | | |
| DGL Standard I | 16.0 | | | | 550 |

+Value according to recent physiological findings

EXAMPLES 2 TO 6

The procedure is substantially as described in Example 1, various further additives as specified in the following Table being added to the straw-whey mixture.

The drying is carried out under the same conditions as in Example 1.

| Example | 2 | 3 | 4 | 5 | 6 |
|---|---|---|---|---|---|
| Components of the mixture | | | | | |
| Straw | 70 | 54 | 60 | 50 | 30 |
| AL-whey (neutralized) | 15 | 40 | 35 | 25 | 60 |
| Brewer's yeast | 10 | — | — | — | — |
| Brewer's grains | — | — | — | 22 | — |
| Vinasse | 5 | — | 15 | 1— | — |
| Save-all substance | — | 3 | — | 3 | 8 |
| Fat | — | 3 | — | — | 2 |

| Example | 2 | 3 | 4 | 5 | 6 |
|---|---|---|---|---|---|
| Proportions of nutrients | | | | | |
| Protein | 12.6 | 16.0 | 20.0 | 25.2 | 30.4 |
| Starch Units | 415 | 465 | 480 | 495 | 580 |
| Crude fibres | 24.0 | 20.0 | 18.0 | 15.0 | 12.0 |
| Crude ash | 6.0 | 6.5 | 7.0 | 8.8 | 6.5 |
| Fat | 1.3 | 4.0 | 1.5 | 0.5 | 3.0 |
| Raw material costs (excluding drying costs) | | | | | |
| DM % | 21.50 | 21.80 | 22.50 | 18.75 | 32.95 |
| Comparison | | | | | |
| Cost price for the consumer for DGL standard | | I | II | III | IV |
| DM % | | 52.75 | 54.00 | 59.75 | 64.00 |

To produce feedstuffs that contain additives, e.g., minerals, trace elements or vitamins, these additives can be added to the whey concentrate.

EXAMPLE 7

145 kg of maize-husk-spadix mixture of 50% by weight residual moisture is mixed with 80 kg of concentrated milk residue of 65% by weight residual moisture. The product obtained is dried in a green drying plant and compressed into cobs in a manner known per se.

The product obtained has a dry mass 72% of which is derived from the maize plant and 28% from the milk residue.

It contains in all 20.1% total protein, 6.1% thereof being derived from the maize and 14.0% from the milk residue. The energy content amounts to 660 STE, 468 STE being from the maize plant and 192 STE from the milk residue. The crude maize fibres amount to 11%. The product obtained is comparable with the feed concentrate for dairy cattle according to DGL Standard II.

EXAMPLES 8 TO 10

The procedure as described in Example 7 is followed. The amounts used and results obtained are given in the following Table.

| Examples | 8 | 9 | 10 |
|---|---|---|---|
| | Moist material amounts before drying, from maize-husk-spadix mixed with | | |
| | Protein-milk | Protein-residue | vinasse |
| Maise-husk-spadix (50% residual moisture) | 120 | 162 | 145 kg |
| Milk residues, concentrated (65% residual moisture) | 115(100) | — | — kg(L) |
| Vinasses (30% residual moisture) | — | 27(22) | 39(31) kg(L) |
| | Dry matter composition in the end product after drying and pressing | | |
| Dry matter amounts | | | |
| Maize plant | 60 | 81 | 73% |
| Milk residues | 40 | — | — |
| Vinasses | — | 19 | 27 |
| Crude protein amounts | | | |
| from maize | 5.1 | 6.9 | 6.2% |
| from milk residue | 20.0 | — | — |
| from vinasses | — | 13.1 | 18.6 |
| giving a total protein content of | 25.1 | 20.0 | 24.8% |
| Energy amounts | | | |
| from maize plant | 390 | 526 | 475 STE |
| from milk residue | 274 | — | — |
| from vinasses | — | 111 | 158 |
| giving a total energy of | 664 | 637 | 653 STE |
| Crude fibre from maize | 9.0 | 12.2 | 11.0% |
| comparable with feed concentrate for dairy cattle according to DGL Standard | III | II | III |

The following is a Comparative Experiment:

A cylindrical glass having a diameter of 100 mm and a height of 180 mm which has a calibration marking at the 1000 ml level is used. 25 grams of feed pellets to be tested are deposited into the glass and the glass filled to the 1000 ml calibration mark with hot water at 75° C. In such test, if the tested feed possesses structure, such structured material would then float on the water. Such structured material is then collected with the aid of a sieve, and spread on blotting paper to be dried. Thereafter, the structured material is measured.

With a feed of the present invention, a visible band of straw particles is formed after dissolution of the feed in the warm water. At the the same time, the other particles sink as a sediment. The structured particles are recovered and their length may be measured. The length thus measured coincides exactly with the values given hereinbefore, i.e., 1 to 16 cm. After drying on the blotting paper, the structured fibers are weighed. Their weight is at least 75% by weight.

With a conventionally produced feed, i.e., that available in the market, and having no structure, a temporary light band is visible, which then sinks to the bottom. No structured material can be recovered, dried and weighed.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. An animal feedstuff in pressed form compressed at a pressure less than 700 atmospheres to a bulk density of about 0.3 to about 1.3 g/ml based on solid, fibrous, agricultural by-products comprising:
   (a) from about 25 to about 95% by weight dry matter of at least one comminuted, solid, structured fibrous, agricultural by-product, having a low nutritional value and selected from the group consisting of cereal straw, leguminous straw, maize columellae, maize-husk-spadix grist, feedstuff cereal mixture, flax plant chaff, flax plant capsules, fibrous fruit peel, fibrous fruit skin and malt sprouts, said agricultural by-product having a length of about 10 to about 160 mm; and
   (b) from about 75 to about 5% by weight dry matter of at least one digestible, non-structured, industrial by-product or residue with nutrient value, selected from the group consisting of whey, protein-enriched residues from milk treatment processes, molasses residues, vinasse, $\alpha$-celluloses, starch, brewer's yeast, brewer's grains, brewing residues, distillery residues, fermentation residues, dregs, kieselguhr residues, and chitin;
   (c) said feedstuff in said pressed form having a moisture content of about 8 to about 14% by weight; the structured agricultural by-product in said feedstuff in said pressed form still retaining its structured integrity, thereby to provide chewability and bits to said animal feedstuff.

2. The animal feedstuff of claim 1 wherein said pressed feedstuff is in the form of pellets, the diameter of said pellets being between about 14 mm and about 32 mm; the length of said pellets being between about 15 mm and about 50 mm; and the density of said pellets being between about 0.8 and about 1.3.

3. The animal feedstuff of claim 1 wherein said pressed feedstuff is in the form of pellets, the diameter of said pellets being about 18 mm and about 24 mm; wherein the length of said pellets is between about 25 mm to about 45 mm; and wherein the density of said pellets is between about 0.7 and 0.85.

4. The animal feedstuff of claim 1 wherein said component (a) comprises cereal straw; and wherein said component (b) comprises whey.

5. The animal feedstuff of claim 1 wherein said component (a) comprises from about 25% to about 85% by weight dry matter of at least one material selected from the group consisting of cereal straw and leguminous straw; and wherein said component (b) comprises from about 75% to about 20% by weight dry matter of by-product whey.

6. The animal feedstuff of claim 1 wherein said component (a) comprises about 50% by weight dry matter straw; wherein said component (b) comprises about 25% by weight dry matter neutralized by-product whey; and including (c) about 22% by weight dry matter by-product brewer's grains; and (d) about 3% by weight α-cellulose.

7. The animal feedstuff of claim 1 wherein said component (a) comprises from about 25% to about 95% by weight dry matter of at least one material selected from the group consisting of cereal straw and leguminous straw; and wherein said component (b) comprises from about 75% to about 5% by weight dry matter selected from the group consisting of whey and brewer's grains.

8. The animal feedstuff of claim 1, wherein components (a) and (b) are so selected as to comprise:

| | |
|---|---|
| straw | about 35% to about 50% by dry weight matter |
| low lactose, protein-enriched whey | about 15% to about 36% by dry weight matter |
| a digestible, industrial by-product or residue with nutrient value selected from the group consisting of α-cellulose and chitin and mixtures thereof | about 2% to about 10% by dry weight matter |
| vinasses | about 2% to about 10% by dry weight matter |
| non-dried brewer's grains | about 20% to about 35% by dry weight matter |
| mineral substances | about 2% to about 5% by dry weight matter |
| and conventional additives selected from the group consisting of antibiotics, enzymes hormones, trace elements, vitamins, pharmaceuticals, and preservatives and mixtures thereof. | up to about 2% by dry weight matter |

9. The animal feedstuff of claim 1 wherein said fibrous fruit peel is selected from the group consisting of citrus fruit peel, and banana peel, and mixtures thereof.

10. The animal feedstuff of claim 1 and further including about 5% to about 20% by weight dry matter of concentrated brewer's yeast and about 1% to about 4% by weight dry matter of a compound selected from the group consisting of fats and fatty acids and mixtures thereof.

11. A process for the production of an animal feedstuff as claimed in claim 1 from solid, fibrous, agricultural by-products, said process comprising the steps of:
(a) intensively mixing (i) from about 25% to about 95% by weight dry matter of at least one comminuted, solid, structured fibrous agricultural by-product having a low nutritional value and length in the range between about 10 and about 160 mm, said agricultural by-product being selected from the group consisting of cereal straw, leguminous straw, maize collumellae, maize-husk-spadix grist, feedstuff cereal mixture, flax plant chaff, flax plant capsules, fibrous fruit peel, fibrous fruit skin and malt sprouts, with (ii) from about 75% to about 50% by weight dry matter of at least one water-containing digestible, non-structured industrial by-product or residue with nutrient value, selected from the group consisting of whey, protein-enriched residues from milk processes, molasses residues, vinasse, molasses residues, α-cellulose, starch, brewer's yeast, brewer's grains, brewing residues, distillery residues, fermentation residues, dregs, kieselguhr residues, and chitin;
(b) partially drying the mixture thereby obtained to a moisture content of about 8% to about 14% by weight; and
(c) processing said mixture into a compressed product by compression at a maximum pressure of 700 atmospheres, to provide a pressed pellet of bulk density of 0.3 to 1.38 g/ml and a moisture content of about 8 to about 14% by weight in which the structured integrity of said agricultural by-product is maintained; thereby to provide chewability and bite to said animal feedstuff.

12. The process of claim 11 wherein said processing step comprises compressing said partially dried mixture under moderate pressure, thereby to provide an animal feedstuff in pelleted form, the diameter of said pellets being between about 14 mm and about 32 mm; the length of the pellets being between about 15 mm and about 50 mm; and the density of said pellets being about 0.8 and about 1.3.

13. The process of claim 11, wherein said processing step comprises compressing said partially dried mixture under moderate pressure, thereby to provide an animal feedstuff in pelleted form, the diameter of said pellets being between about 18 mm and about 24 mm; the length of the pellets being between about 25 mm to about 45 mm; and the density of said pellets being between about 0.7 and 0.85.

14. The process of claim 11 wherein said processing step is carried out by the combination of a metering screw and a press where the partially dried material is formed into compressed fodder at moderate pressure substantially less than 7000 atmospheres.

15. A process for the production of an animal feedstuff as claimed in claim 11 wherein step (a) comprises: intensively mixing (i) about 25% to about 80% by weight dry matter of at least one material selected from the group consisting of cereal straw and leguminous straw having a length of about 120 to 160 mm with (ii) about 75% to about 20% by weight of by-product whey; wherein step (b) comprises: partially drying the mixture thereby obtained; and wherein step (c) comprises compresing the mixture into an animal feedstuff while essentially retaining the length characteristic and structured integrity of said fibrous cereal straw or leguminous straw.

16. The process of claim 11 wherein said partial drying step is carried out in a green fodder drying plant.

17. The process of claim 11 wherein said partially drying step is carried out in a slurry drying plant.

18. The process of claim 11 including the step of adding sufficient water prior to or during step (a) to ensure intensive mixing of said fibrous by-product and said other by-product.

19. The process of claim 11 including the further step prior to or during step (a) of the addition of chitin.

* * * * *